United States Patent
Shimizu et al.

(10) Patent No.: US 10,384,636 B2
(45) Date of Patent: *Aug. 20, 2019

(54) CURTAIN AIRBAG DEVICE

(71) Applicant: AUTOLIV DEVELOPMENT AB, Vargarda (SE)

(72) Inventors: Takayuki Shimizu, Yokohama (JP); Yuto Kobayashi, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 132 days.

This patent is subject to a terminal disclaimer.

(21) Appl. No.: 15/567,799

(22) PCT Filed: Mar. 22, 2016

(86) PCT No.: PCT/JP2016/059072
§ 371 (c)(1),
(2) Date: Oct. 19, 2017

(87) PCT Pub. No.: WO2016/170892
PCT Pub. Date: Oct. 27, 2016

(65) Prior Publication Data
US 2018/0050653 A1    Feb. 22, 2018

(30) Foreign Application Priority Data

Apr. 20, 2015 (JP) ................. 2015-085826

(51) Int. Cl.
*B60R 21/232* (2011.01)
*B60R 21/213* (2011.01)
(Continued)

(52) U.S. Cl.
CPC .......... *B60R 21/232* (2013.01); *B60R 21/201* (2013.01); *B60R 21/213* (2013.01);
(Continued)

(58) Field of Classification Search
CPC .... B60R 21/232; B60R 21/213; B60R 21/237
See application file for complete search history.

(56) References Cited

U.S. PATENT DOCUMENTS 6,942,242 B2 * 9/2005 Hawthorn ............... B60R 21/16
280/728.2
7,441,796 B2 * 10/2008 Noguchi ............... B60R 21/232
280/730.2
(Continued)

FOREIGN PATENT DOCUMENTS

CN    102294986 A    12/2011
DE    197 52 989 A1    6/1998
(Continued)

OTHER PUBLICATIONS

International Search Report of PCT/JP2016/059072, dated Jun. 7, 2016.
(Continued)

*Primary Examiner* — Faye M Fleming
(74) *Attorney, Agent, or Firm* — Brinks Gilson & Lione

(57) ABSTRACT

A cover member (18) is formed of a pliable fabric material having a plurality of polymer fibers, and is configured to maintain the shape of the airbag by mutual fusion of at least part of the polymer fibers. The cover member (18) is configured to have a high stiffness portion (25) of higher stiffness than other portions of the cover member, as a result of partial overlaying of the pliable fabric material in more folds than at other portions.

19 Claims, 6 Drawing Sheets

(51) Int. Cl.
  *B60R 21/237* (2006.01)
  *B60R 21/201* (2011.01)
  *D04H 3/011* (2012.01)
  *D04H 3/147* (2012.01)
  *B60R 21/2165* (2011.01)
  *B60R 21/217* (2011.01)
  *B60R 21/231* (2011.01)
  *B60R 21/2338* (2011.01)
  *B60R 21/235* (2006.01)

(52) U.S. Cl.
  CPC ...... *B60R 21/2165* (2013.01); *B60R 21/2176* (2013.01); *B60R 21/235* (2013.01); *B60R 21/237* (2013.01); *B60R 21/2338* (2013.01); *B60R 21/23138* (2013.01); *D04H 3/011* (2013.01); *D04H 3/147* (2013.01); *B60R 2021/23386* (2013.01); *B60R 2021/23514* (2013.01); *B60R 2021/23547* (2013.01)

(56) References Cited

U.S. PATENT DOCUMENTS

| | | | |
|---|---|---|---|
| 8,714,587 | B2 | 5/2014 | Nakamura et al. |
| 2011/0291393 | A1 | 12/2011 | Nakamura et al. |
| 2018/0111579 | A1* | 4/2018 | Shimizu ................ B60R 21/201 |

FOREIGN PATENT DOCUMENTS

| | | |
|---|---|---|
| EP | 2 390 144 A1 | 11/2011 |
| JP | H 10-203288 A | 8/1998 |
| JP | 2002-249012 A | 9/2002 |
| JP | 2002-249015 A | 9/2002 |
| JP | 2003-170798 A | 6/2003 |
| JP | 2003-306118 A | 10/2003 |
| JP | 2006-123674 A | 5/2006 |
| JP | 2010-126078 A | 6/2010 |
| JP | 2011-246078 A | 12/2011 |

OTHER PUBLICATIONS

International Search Report of PCT/JP2016/059073 dated Jun. 7, 2016.

* cited by examiner

INFLATOR SIDE →

CURTAIN AIRBAG DEVICE

CROSS-REFERENCE TO RELATED APPLICATION

This application is a 35 U.S.C. § 371 national phase application of International PCT Application No.: PCT/JP2016/059072, filed Mar. 22, 2016, which claims the benefit of priority under 35 U.S.C. § 119 to Japanese Patent Application No.: 2015-085826, filed Apr. 20, 2015, the contents of which are incorporated herein by reference in their entirety.

FIELD OF THE INVENTION

The present invention relates to a curtain airbag device installed in a vehicle, and more particularly to a curtain airbag device having the function of regulating the deployment direction of an airbag.

BACKGROUND

As an instance of known public use, vehicles have come in recent years to be provided with one or a plurality of inflatable airbags, with a view to protecting occupants, and in some cases also pedestrians, during a vehicle accident. Airbags are ordinarily formed of a flexible fabric, but some other flexible sheet material, such as plastic materials, are used in some cases. Airbags come in various forms, for instance so-called driver airbags that protect the driver by inflating from the vicinity of the center of the steering wheel of an automobile, curtain airbags that protect an occupant during a side impact, or during a rollover or overturn accident, by deploying downward on the inward side of an automobile window, and also side airbags that deploy between an occupant and a side panel, so as to protect the occupant during a side impact. The present invention is especially adapted for curtain airbags, but can also be used in airbags of other types without any particular limitations.

The useable packaging space for mounting of airbag devices within vehicles is ordinarily limited, and is often designed to be very small. There are various conceivable reasons for this, for instance aesthetic considerations, and considerations pertaining to the comfort and convenience of the occupants. Accordingly, there are known airbags that are packaged by compression and that take up only a small space in a rolled and/or folded-up state when not deployed.

For instance, structures have been proposed that are provided with a hard plastic cover around an airbag, in order to maintain the packaged state of the compressed airbag and to facilitate mounting of a unit to an automobile, in a simple and reliable manner. However, this significantly increases the cost and weight of an airbag unit, and also the volume of the packaged airbag, and accordingly it is difficult to produce an airbag unit of sufficiently small size. Moreover, a large space is also required during transport, which translates into higher transport costs, due to the fact that the airbag is covered by the hard cover member.

A jump bracket may be used in a curtain airbag device in order to regulate the deployment direction of the airbag. The jump bracket, which is formed of a hard resin or metal, guides the compressed airbag so as to deploy smoothly in a desired direction during inflation. Using a jump bracket entails however an increase in the number of parts, and in a larger airbag package.

A protrusion such as interior door or roof pillar (including a pillar garnish or trim) is typically present in the vicinity of a window in the vehicle side. The curtain airbag device is disposed so as to straddle an intermediate pillar such as a B pillar, and accordingly the pillar garnish may break, or conversely the airbag may be damaged when the airbag hits the pillar garnish violently at the initial stage of airbag deployment.

An object of the present invention, arrived at in the light of the above circumstances, is to provide a curtain airbag device that allows maintaining the shape of a compressed airbag by means of a simple and compact structure.

A further object of the present invention is to provide a curtain airbag device that allows regulating the deployment direction of an airbag through use of a simple structure.

Yet another object of the present invention is to provide a curtain airbag device the structure of which allows precluding situations such as damage to a cabin structure, for instance a pillar garnish, and damage to the airbag, caused by contact between the airbag and the structure during deployment of the airbag.

SUMMARY OF THE INVENTION

The present invention is a curtain airbag device provided with an airbag that is disposed along a roof side rail of a vehicle interior, and that can deploy so as to cover a window portion on a vehicle side face, the curtain airbag device including a cover member that forms the airbag into an elongate shape by folding or rolling the same and that covers the outer periphery of the airbag at least in part of the airbag in the longitudinal direction, wherein the cover member is formed of a pliable fabric material having a plurality of polymer fibers, and is configured to maintain the shape of the airbag through mutual fusion of at least part of the polymer fibers. The cover member is formed to have a high stiffness portion of higher stiffness than that of other portions of the cover member, as a result of partial overlaying of the pliable fabric material in more folds than at the other portions.

The present invention, having such a configuration, allows maintaining the shape of the airbag using a cover made of fabric, and allows regulating the deployment direction of the airbag by use of a high stiffness portion of the cover member. As a result it becomes possible to achieve a simpler, less expensive and lighter structure thanks to a smaller number of parts.

Preferably, the high stiffness portion of the cover member is disposed below the airbag, and is provided at a position above a vehicle protruding part such as a pillar garnish, overlapping at least the protruding part during deployment of the airbag. In such a configuration, the cover member is interposed between the airbag and a structure of the interior of the cabin, for instance a pillar garnish, during airbag deployment. Accordingly, the airbag can deploy without snaring on the upper end section of the pillar garnish, without breakage of the structure, and without damage to the airbag. The high stiffness portion of the cover member is provided between the airbag of elongate shape and a vehicle body. As a result, the airbag can be prevented from being damaged when hitting the vehicle body during deployment, and it becomes possible to control the deployment direction of the airbag.

Part of the cover member may be connected to the airbag through stitching, and as a result the cover member can be prevented from being blown away (i.e. disconnected) during deployment of the airbag. A weak portion capable of tearing in the longitudinal direction of the airbag of elongate shape can be formed in the cover member, and the cover member can be configured so that the lower part of the cover member covers the protruding part, after tearing of the cover member. Due to such a configuration, the protruding part does not break due to contact between the airbag with the protruding part during deployment of the airbag, and the airbag is not damaged.

The weak portion can be configured for example as a plurality of slits arrayed and formed in the cover member in the longitudinal direction of the airbag of elongate shape. Alternatively, the weak portion can be configured in the form of at least one groove portion provided in the longitudinal direction of the airbag of elongate shape. The slits or groove portions can be prescribed to form a line in the longitudinal direction of the airbag of elongate shape. The slits and groove portions can each be set to have a triangular shape or V-shape, and be disposed so that the vertices are oriented, like arrows, from the upstream direction to the downstream direction of the flow of inflating gas. As a result, the slits can tear apart smoothly on account of the flow of the inflating gas, which contributes to a rapid deployment of the airbag.

DETAILED DESCRIPTION OF THE INVENTION

Figure 1:
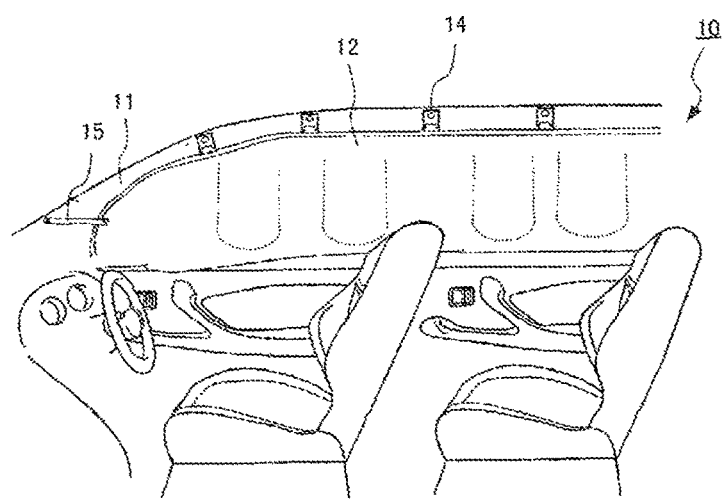
FIG. 1 is a cross-sectional diagram of a cabin portion of an automobile provided with a curtain airbag device according to the present invention, depicting a deployed state.

FIG. 1 is a cross-sectional diagram of a cabin portion of an automobile provided with a curtain airbag device 10 according to the present invention, depicting a deployed state. As illustrated in FIG. 1, an airbag 12 is fixed by bolts or studs, using a plurality of mounting tabs 14, to an inner panel covered with headlining, at the top of a window glass on the cabin side.

The reference symbol 11 denotes an A pillar. There is also provided a strap (or tether) 15 that connects the A pillar 11 and the front edge of the airbag 12. The strap 15 can be formed as a band of uniform width, out of the same material (fabric) as that of the airbag 12. The strap 15 itself can be formed of a material (for instance a synthetic resin) different from that of the airbag.

Figure 2:
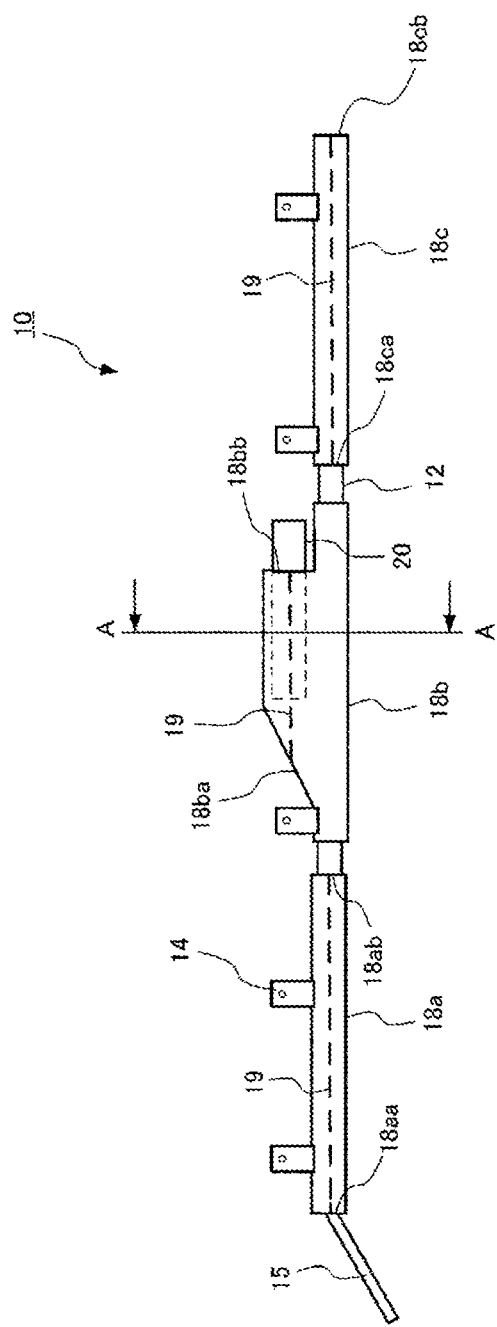
FIG. 2 is a side-view diagram illustrating the structure of a curtain airbag device according to a first example of the present invention, depicting a stored state before deployment.

FIG. 2 is a side-view diagram illustrating the structure of a curtain airbag device according to a first example of the present invention, depicting a stored state before deployment. The curtain airbag device 10 of the present example is provided with an airbag 12 that is disposed along a roof side rail of a vehicle interior, and that can deploy so as to cover a window portion on a vehicle side. The airbag 12 is provided with cover members 18a, 18b, 18c formed to an elongate shape through folding or rolling, and that cover outer periphery of the airbag 12, at least in part of the longitudinal direction of the airbag 12. The cover members 18a, 18b, 18c are formed of a pliable fabric material having a plurality of polymer fibers, and are configured to reduce the diameter of a cross-section of the airbag and maintain the shape of the airbag, through mutual fusion of at least some of the polymer fibers. The diameter of the cross-section of the airbag 12 at the portion covered by each cover member 18 is reduced through compression.

The airbag 12 can be formed by superimposing two substantially identical sheets of a flexible material such as a woven fabric, and by connecting the sheets to each other at aligned edges of the sheets, by a peripheral seam, to define a large inner inflatable portion between the sheets that receives inflating gas from an inflator 20 such as a gas generator. The airbag 12 can also be obtained by overlaying two layers resulting from folding in half of one sheet of a flexible material, the layers being then connected to each other by a peripheral seam. Alternatively, the airbag 12 can be woven in accordance with a so-called "One Piece Weaving" (OPW) technique, wherein warp and weft yarns that form an inflating region and a non-inflating region are interwoven at a selected portion, to form a woven structure of a plurality of sheets, and to form a peripheral connection portion in which the plurality of sheets are connected to an inflation chamber (chamber).

The fabric for producing the airbag 12 is preferably a plastic fabric, for instance a fabric formed through weaving of warp and weft yarns of polyamide fibers. The fabric may be coated with a thermoplastic material. As illustrated in FIG. 2, the airbag 12 is formed so as to have an opening for insertion of the inflator 20 into the airbag 12. For instance, a cylindrical inflator extends passing through the opening, such that most of the length of the inflator is present inside the airbag 12.

In order to package the airbag 12 so as to be installable in a vehicle, the airbag 12 is firstly rolled and/or folded, to a rod-like shape. A package may be formed by folding the airbag 12, or by forming two or more rolls in the airbag 12, or by combining known techniques of airbag rolling and folding. In a rolling technique the airbag 12 may be rolled around a mandrel (not shown) to yield a package that is then pulled out in the axial direction.

The cover members 18a, 18b, 18c may be wound so as to enclose the entire circumferential direction of the roll-like airbag 12. Part of each cover member 18 can be held by basting or the like against the base fabric of the bag, so as to preclude unraveling of the airbag 12 and of the cover member 18. As described below, a weak portion 19 may be provided beforehand in the form of perforations, slits or grooves, in the cover member 18. This weak portion 19 is configured to break during inflation of the airbag 12, in such a manner that the airbag 12 deploys easily out of the cover members 18a, 18b, 18c when deploying at the time of a collision. The weak portion 19 may be provided so as to reach respective end sections 18*aa*, 18*ab*, 18*ba*, 18*bb*, 18*ca*, 18*cb* of the cover members 18*a*, 18*b*, 18*c*. Preferably, each weak portion 19 constitutes an origin of tearing, at which the cover member tears readily apart during inflation and deployment of the airbag. In the example of FIG. 2, the weak portion 19 is configured in the form of linear (straight line-like) slits or a groove portion provided in the longitudinal direction of the airbag 12. The bottom of the weak portion 19 formed as a groove is formed to be thinner than other portions, and accordingly tears apart readily.

The material of the cover members 18*a*, 18*b*, 18*c* can take the form of a nonwoven fabric material having a plurality of polymer fibers, being a pliable fabric material. A felt-like fabric can be used as the nonwoven fabric. For instance, the fabric is a polyester felt produced in accordance with a known needle method that involves tangling and fixing polyester fibers to one another through needling. The polyester fibers can be provided in the form of polyethylene terephthalate (PET), with the felt material being made of 100% PET. The fibers making up the felt material are tangled with each other in a random or quasi-random fashion. The felt can include fibers of two different configurations.

Mono-component fibers that make up the felt of the cover members 18*a*, 18*b*, 18*c* can all be formed of a PET homopolymer, but there can be used bi-component composite fibers having a core and a sheath that surrounds the core. The core and the sheath of the bi-component composite fibers are configured so as to have different characteristics. In particular, the melting points of the foregoing are different, or alternatively the sheath has a significantly lower melting point (for instance in the range of 120° C. to 150° C.) than that of the core. The bi-component composite fibers can all be formed of PET, but it is possible to form the core out of a PET homopolymer, and to form the sheath out of a PET copolymer (coPET). Although the melting point of the sheath is lower than the melting point of the core as a result of such a combination of PET and coPET, the entirety of the fibers can be reliably formed of PET. Both the core of the bi-component composite fibers and the mono-component fibers are formed of a PET homopolymer, and accordingly the foregoing have mutually identical melting points, with the mono-component fibers having a higher melting point than that of the sheath of the bi-component composite fibers. The bi-component composite fibers are evenly distributed throughout the mono-component fibers in the felt material. The bi-component composite fibers can take up 30% to 60% of the totality of fibers in the felt material, the balance being made up of just mono-component fibers. The materials that are used in the mono-component fibers and bi-component composite fibers may be configured so as to include partially the above fibers, so long as the fibers can fuse together effectively.

The airbag 12 having been shaped in the form of a roll-like and/or folded shape is wrapped with the felt cover members 18*a*, 18*b*, 18*c*, to form thereby an intermediate package. Thereafter, the sites to be compressed and surrounded by the cover members 18*a*, 18*b*, 18*c* are pressed using a press machine (not shown), to be thus compressed to the desired three-dimensional shape and size. The press machine operates while heating the intermediate package, for instance at a temperature higher than the melting point of the sheath of the bi-component composite fibers but lower than the melting points of the core of the bi-component composite fibers and of the mono-component fibers. Heat and pressure need not essentially be applied to the package at the same time. A three-dimensional shape can be obtained easily through press compression of the intermediate package, by virtue of the flexibility of the airbag 12 and the flexibility of the initial cover members 18*a*, 18*b*, 18*c*.

In a case where the airbag 12 is formed of a plastic fabric, the fabric of the airbag 12 deforms plastically, when compressed, as a result of simultaneous application of pressure and heat to the intermediate package. The roll-like airbag 12 inside the intermediate package retains the compressed shape even when cooled thereafter. Even if the airbag 12 is not formed of a plastically deformable material, however, simultaneous application of heat and pressure to the intermediate package causes in any event the felt material of each cover member 18 to plastically deform in that, when compressed, the fibers of the felt material become compressed together, and the felt material becomes accordingly thinner (for example 0.55 mm). More specifically, the sheath of the bi-component composite fibers melts when heated at a temperature higher than the melting point of the sheath. Therefore, the sheaths fuse together at all the positions of the distributed fibers in the cover member 18. The cover member 18 is heated at a temperature lower than the melting points of the core of the bi-component composite fibers and of the entire structure of the mono-component fibers; accordingly, the cores and the mono-component fibers remain as a solid phase without fusing together, and it is only the material in the sheaths that fuses.

The cover member may be provided divided in two or more members in the longitudinal direction of the curtain airbag. Sites at which the airbag 12 is exposed become thus formed between the divided cover members. This allows for bending of the airbag unit. By being thus made bendable, the airbag unit can be folded to a small size when stored, and can accordingly be stored and transported efficiently. In the present invention, there are three divided cover members 18*a*, 18*b*, 18*c*, with the roll-like airbag 12 exposed in gaps therebetween.

Figure 3:
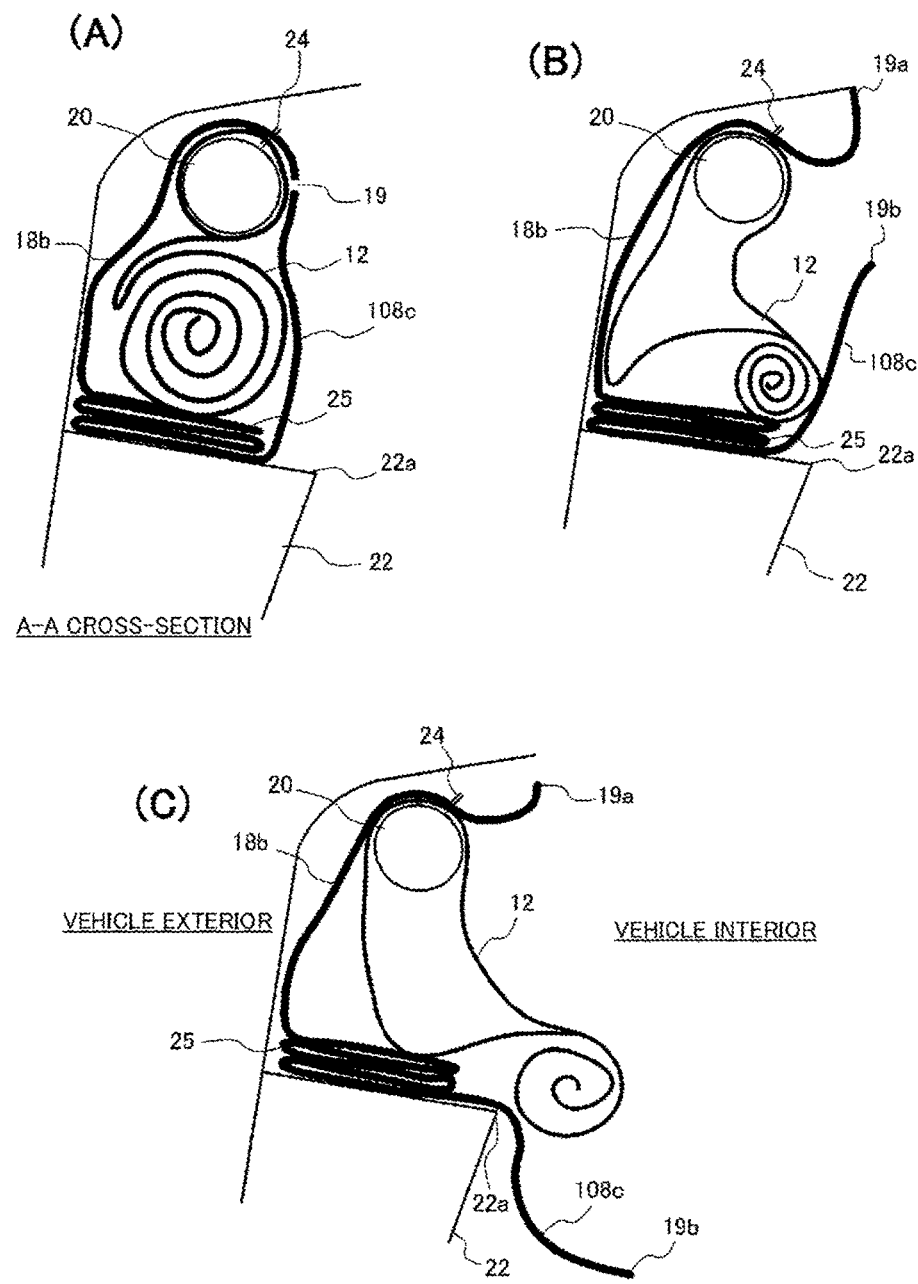
FIGS. 3(A), 3(B), and 3(C) are cross-sectional diagrams illustrating structures of a main part of a curtain airbag device according to an example of the present invention, corresponding to a cross-section of FIG. 2 in direction A-A, and where 3(A) illustrates a state before deployment, 3(B) illustrates an initial deployment state, and 3(C) illustrates a state in the middle of deployment.

FIGS. 3(A), 3(B), and 3(C) are cross-sectional diagrams illustrating structures of a main part of a curtain airbag device according to an example of the present invention, corresponding to a cross-section of FIG. 2 in direction A-A. In the figures, 3(A) illustrates a state before deployment, 3(B) illustrates an initial deployment state and 3(C) illustrates a state in the middle of deployment. Firstly, the cover member 18*b* is provided with a high stiffness portion 25 of higher stiffness than that of other portions of the cover member, as a result of partial overlaying of the pliable fabric material in more folds than at other portions, as illustrated in FIG. 3(A). The other cover members 18*a*, 18*c* may likewise be provided with a high stiffness portion. In the present example, a region of high stiffness is formed through heating compression of a portion, of the cover member 18, simply folded on itself, without using any special member. The production process has just a step of partially folding the cover member 18 while laying up the resulting folds, and is thus simpler than a process that involves providing another member. Alternatively, there may be prepared a separate overlaying member of a material identical or similar to that of the cover member, according to the shape of the portion to which high stiffness is to be partially imparted, and to arrange the other member at the portion where the stiffness of the cover member is to be increased, followed by heating compression together with the cover member. The degree of freedom of the shape of the cover member is increased as a result.

In the figures, the reference symbol 22 denotes a pillar garnish provided on the side of the cabin. The airbag unit is disposed above the pillar garnish 22, so that the high stiffness portion 25 sits on the end face of the pillar garnish 22. The shape of the upper edge of the pillar garnish is not uniformly planar, but has ordinarily some irregularities. The lower portion of the airbag in the airbag unit is held by the high stiffness portion 25, and hence the airbag can deploy without snaring on the upper edge of the pillar garnish having an irregular shape. The top of the cover member 18b is connected to the airbag 12 by way of stitching 24. The cover member 18b has formed therein a slit as a weak portion 19 that can tear in the longitudinal direction of the elongate airbag 12. The cover member 18b is designed so that a lower portion 18c thereof covers the pillar garnish 22 after tearing of the cover member 18b. Accordingly, a stitching position 24 between the cover member 18b and the elongate airbag 12 is set to lie above the weak portion 19 (slit), on the inward side of the cabin. The reference symbol 20 denotes an inflator.

Upon operation of the airbag device from the state in FIG. 3(A), the airbag 12 starts inflating on account of the inflating gas released by the inflator 20, and eventually the cover member 18b tears apart at the weak portion 19, as illustrated in 3(B). An upper edge 19a that breaks away from the weak portion 19 of the cover member 18b jumps then upward. Thereafter, as deployment of the airbag 12 progresses, a lower edge 19b that breaks away from the weak portion 19 of the cover member 18b hangs down, and a corner of the pillar garnish 22 is covered by a lower portion 18c of the cover member 18b, as illustrated in 3(C). During such an operation, the airbag 12 deploys in a controlled manner towards the interior of the vehicle due to the presence of the high stiffness portion 25 of the cover member 18b, even if the upper edge of the pillar garnish is rugged. Moreover, the vehicle interior-side end section 22a at the top of the pillar garnish is covered, during inflation and deployment of the airbag, by the lower portion 18c of the cover member 18b, and accordingly it becomes possible to prevent breakage of the pillar garnish in that the deploying airbag does not snare on the edge of the top end of the pillar garnish.

Figure 4:
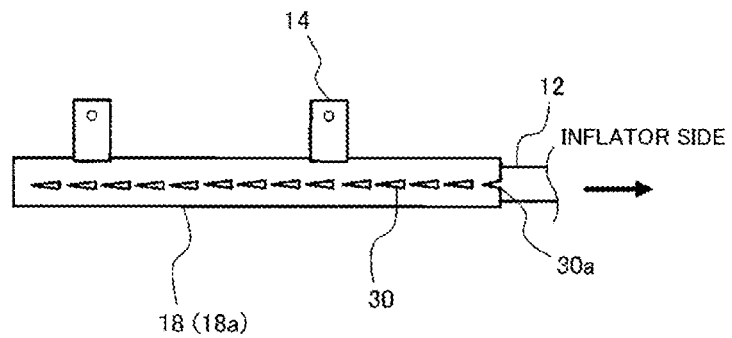
FIG. 4 is a front-view diagram illustrating the shape of a weak portion (slits) formed in a cover member of a curtain airbag device according to an example of the present invention.
Figure 5:
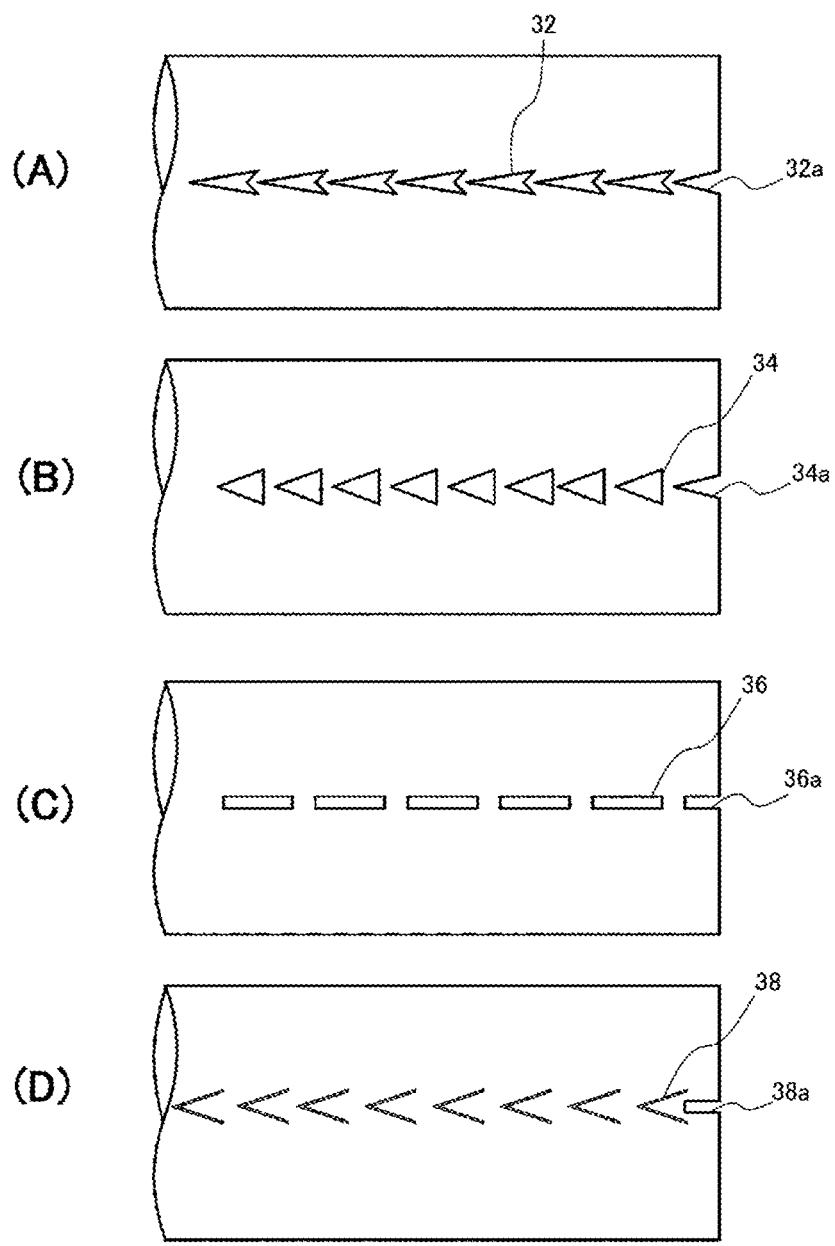
FIGS. 5(A), 5(B), 5(C), and 5(D) are explanatory diagrams illustrating other examples of the weak portion illustrated in FIG. 4.

FIG. 4 is a side-view diagram illustrating another shape of the weak portion (in the form of slits 19) formed in the cover member 18 of the curtain airbag device according to an example of the present invention. The weak portion 19 (slits) are configured out of a plurality of triangular openings 30 arrayed along a straight line in the longitudinal direction of the airbag 12. One vertex of each of the triangles of the openings 30 is disposed so as to be oriented from the upstream direction to the downstream direction of the flow of the inflating gas. A cut 30a constituting an origin of tearing is formed at the inflator-side end section of the cover member 18. The cover member 18 in the present example is fixed through heating compression, and accordingly a weak portion 19 that tears apart reliably is important in order to achieve rapid deployment of the airbag 12.

FIGS. 5(A)-5(D) illustrated other examples of the weak portion 19 depicted in FIG. 4. In the figure, 5(A) corresponds to openings 32 shaped as arrows, with a sharp tip and an inwardly-recessed rear end. The tip of one given opening is disposed so as to overlap with (thrust into) the rear end of a respective opening ahead. This makes for easier tearing. Further, FIG. 5(B) corresponds to triangular openings 34 substantially identical to the openings 30 illustrated in FIG. 4. Next, FIG. 5(C) corresponds to a linear array of elongate rectangular openings 36. Lastly, FIG. 5(D) corresponds to V-shape cuts 38 disposed such that the inflection (vertex) of the V-shape is oriented from the upstream direction to the downstream direction of the flow of the inflating gas.

Figure 6:
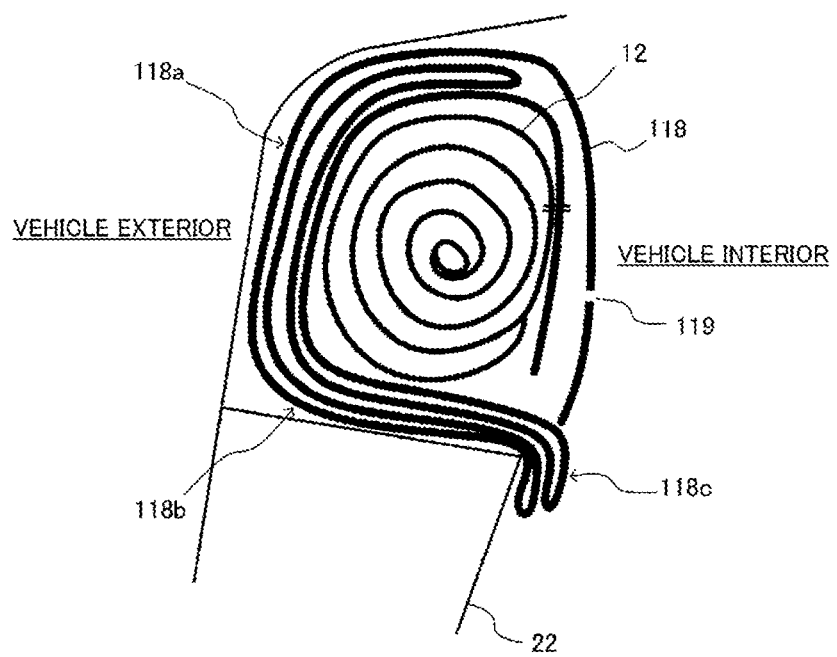
FIG. 6 is a cross-sectional diagram illustrating the structure of a main part (cover member) of a curtain airbag device according to another example of the present invention, corresponding to a cross-section in direction A-A in FIG. 2, and depictions of the airbag inside the cover member have been omitted.

FIG. 6 is a cross-sectional diagram illustrating the structure of a main part (cover member 118) of a curtain airbag device according to another example of the present invention, corresponding to a cross-section in direction A-A in FIG. 2. In the present example, a high stiffness portion 118a of the cover member 118 is disposed between the airbag 12 and the vehicle body, and a high stiffness portion 118b is formed between the airbag 12 and the pillar garnish 22. The high stiffness portions 118a, 118b receive the force of airbag inflation during deployment of the airbag 12. The high stiffness portions allow minimizing deformation of the cover member 18 even when receiving the force of inflation. This allows controlling the inflation and deployment direction of the airbag. Further, the airbag is prevented from hitting directly the inner panel of the vehicle during inflation, and accordingly bursting and the like can be prevented without damage to the airbag. Further, a high stiffness portion 118c may be disposed so as to cover the corner of the pillar garnish 22, from a state before deployment of the airbag 12, as illustrated in FIG. 6, so long as the airbag unit during installation on the vehicle is not exposed inside the cabin. The deployment direction of the airbag 12 can be regulated reliably by the cover member 118, by resorting to a structure such as the one of the example illustrated in FIG. 6. By virtue of the presence of the lowermost end 118c of the cover member 118 it becomes possible to avoid, yet more reliably, problems (for instance, snaring of the airbag on the pillar garnish during deployment of the airbag, failure of the airbag to deploy neatly, bursting of the bag, or breakage of the end section of the pillar garnish) derived from collision between the airbag 12 and the pillar garnish 22.

An embodiment in which the nonwoven fabric materials 18a, 18b, 18c of felt type of the present invention are used as a pliable fabric material has been explained in specific terms above, but for instance a woven fabric or the like can also be used, besides nonwoven materials. Specifically, it suffices herein that the fabric has a material composition or has a constituent fiber structure that confers mobility or elastic behavior to the fibers of the fabric.

While the above description constitutes the preferred embodiment of the present invention, it will be appreciated that the invention is susceptible to modification, variation and change without departing from the proper scope and fair meaning of the accompanying claims.

The invention claimed is:

1. A curtain airbag device provided with an airbag that is adapted to be disposed along a roof side rail of a vehicle interior, and that can deploy during a deployment so as to cover a window portion on a vehicle side face, the curtain airbag device comprising,
   a cover member that forms the airbag in a rolled or folded state into an elongate shape and that covers the outer periphery of the airbag at least in a part of the airbag in the longitudinal direction, wherein
   the cover member is formed of a pliable fabric material having a plurality of polymer fibers, and is configured to maintain the shape of the airbag in the rolled or folded state through mutual fusion of at least part of the polymer fibers; and
   the cover member is formed to have a high stiffness portion of higher stiffness than that of another portion of the cover member as a result of a partial overlaying of the pliable fabric material in one or more folds.

2. The curtain airbag device according to claim 1, further comprising,
   a protruding part jutting into the vehicle interior is formed on a side of the vehicle interior; and the high stiffness portion of the cover member is provided below the airbag and at a position overlapping at least the protruding part, during the deployment of the airbag.

3. The curtain airbag device according to claim 1, further comprising, the high stiffness portion of the cover member is provided between the airbag in the rolled or folded state and a vehicle body.

4. The curtain airbag device according to claim 2, further comprising,
a part of the cover member is connected to the airbag by stitching,
a weak portion capable of tearing in the longitudinal direction of the airbag in the rolled or folded state is formed in the cover member, and
the cover member is configured so that a lower part of the cover member covers the protruding part, after tearing of the cover member during the deployment.

5. The curtain airbag device according to claim 4, further comprising, a stitching position between the cover member and the airbag in the rolled or folded state is above the weak portion on the side of the vehicle interior.

6. The curtain airbag device according to claim 4, further comprising, the weak portion of the cover member is formed at a position so that the lower part of the cover member covers sufficiently the protruding part during the deployment.

7. The curtain airbag device according to claim 4, further comprising, the weak portion is a plurality of slits or a groove portion arrayed and formed in the cover member in the longitudinal direction of the airbag in the rolled or folded state.

8. The curtain airbag device according to claim 4, further comprising, the weak portion is at least one groove portion provided in the longitudinal direction of the airbag in the rolled or folded state.

9. The curtain airbag device according to claim 7, further comprising, the slit or the groove portion is provided, in a linear fashion, in the longitudinal direction of the airbag in the rolled or folded state, so as to reach at least one end section of the cover member.

10. The curtain airbag device according to claim 7, further comprising, each of the slits or the groove portion is of a triangular shape, and is formed and disposed such that a vertex of each of the slits or groove portion is oriented from the upstream direction to the downstream direction of the flow of an inflating gas during the deployment.

11. The curtain airbag device according to claim 7, further comprising, the slits have a V-shape, and are disposed and formed such that an inflection-portion of the V-shape is oriented from the upstream direction to the downstream direction of the flow of an inflating gas during the deployment.

12. The curtain airbag device according to claim 2, further comprising, the protruding part is a pillar garnish that covers an intermediate pillar.

13. The curtain airbag device according to claim 1, further comprising, the pliable fabric material is a nonwoven fabric.

14. The curtain airbag device according to claim 1, wherein, the plurality of polymer fibers comprise a plurality of bi-component composite fibers having a core and a sheath, such that the shape of the airbag in the rolled or folded state is stabilized through a fusion of the sheaths of the bi-component composite fibers to one another.

15. The curtain airbag device according to claim 14, further comprising,
the core of the bi-component composite fibers is composed of a polymer material having a first melting point; and
the sheath of the bi-component fibers is composed of a polymer material having a second melting point lower than the first melting point.

16. The curtain airbag device according to claim 14, further comprising, at least a portion of the plurality of polymer fibers are composed of a plurality of mono-component fibers.

17. The curtain airbag device according to claim 15, further comprising,
at least a portion of the plurality of polymer fibers are composed of a plurality of mono-component fibers; and
the mono-component fibers have a melting point higher than the second melting point of the sheath of the bi-component composite fibers.

18. The curtain airbag device according to claim 15, further comprising,
the core of the bi-component composite fibers is composed of a PET homopolymer, and
the sheath is composed of a PET copolymer.

19. The curtain airbag device according to claim 16, further comprising, the mono-component fibers is composed of PET.

* * * * *